United States Patent Office.

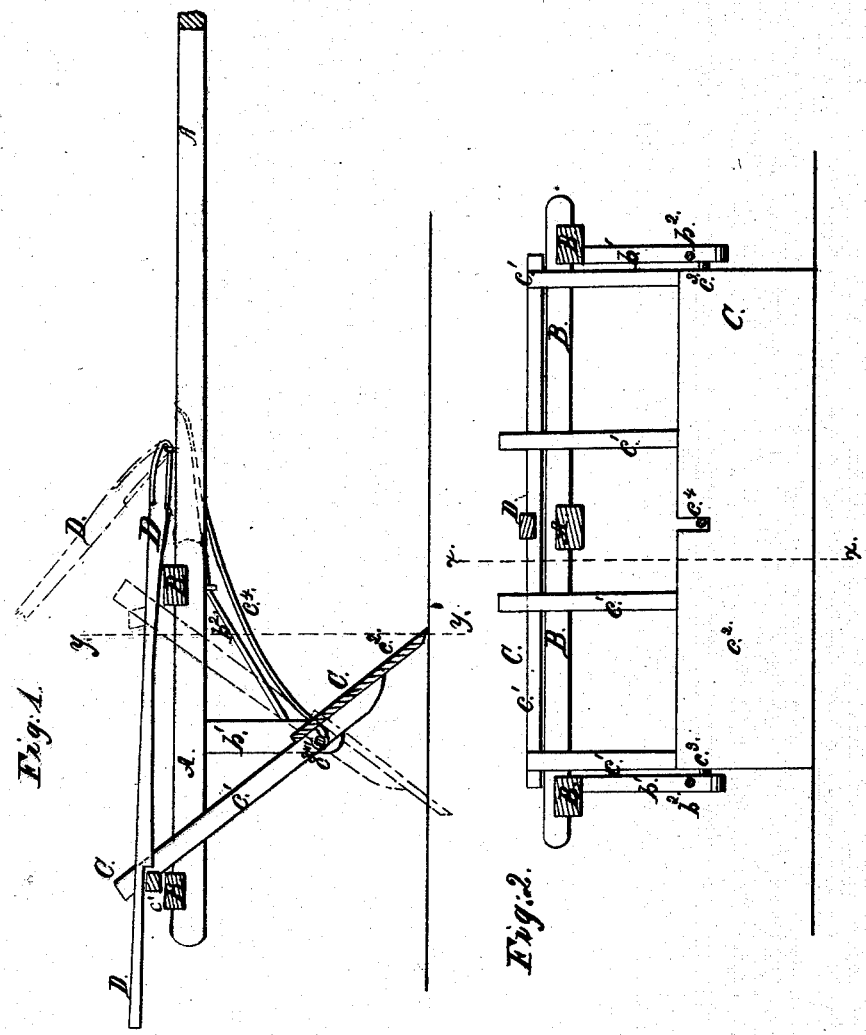

IRA MUNSON, OF WAYNE, MICHIGAN.

Letters Patent No. 61,854, dated February 5, 1867.

IMPROVED SCRAPER.

*The Schedule referred to in these Letters Patent and making part of the same.*

TO ALL WHOM IT MAY CONCERN:

Be it known that I, IRA MUNSON, of Wayne, in the county of Wayne, and State of Michigan, have invented a new and useful improvement in Adjustable Scraper; and I do hereby declare that the following is a full, clear, and exact description thereof, which will enable others skilled in the art to make and use the same, reference being had to the accompanying drawing, forming a part of this specification, in which—

Figure 1 is a sectional view of my improved scraper, taken through the line $x\ x$, fig. 2, and showing in red lines the position of the parts when unloaded.

Figure 2 is a sectional view of the same, taken through the line $y\ y$, fig. 1.

Similar letters of reference indicate like parts.

My invention has for its object to furnish an adjustable scraper so constructed that the team can be driven and the scraper operated by one man, thus dispensing with the services of the one or two additional men required when an ordinary scraper is used; and it consists of an improved adjustable scraper formed by the combination of the blade or shovel of the scraper with the frame, tongue, and lever catch, as hereinafter more fully described.

A is the tongue, to the rear part of which is attached a frame, B, from the side bars of which project down the arms $b^1$, as shown in the drawings. The upper ends of the arms $b^1$ are securely attached to the frame B, and they are strengthened by braces, $b^2$, as shown in figs. 1 and 2. Between the lower ends of the arms $b^1$ is pivoted the scraper blade or shovel C. When the shovel is formed by plating a wooden, or other framework, $c^1$, with metal plates, $c^2$, the pivoting may be done by passing the pivoting-rod $c^3$ through the lower ends of the arms $b^1$ and the said framework $c^1$. In this case the middle part of the pivoting-rod $c^3$ should be strengthened by a brace, $c^4$, the end of which extends forward and is attached to the tongue A. D is a lever catch, the forward end of which is pivoted to the tongue A, as shown in fig. 1. Upon the rear part of the lever D is formed a shoulder or catch for holding the shovel C of the scraper in position while being operated. In using the scraper the rear side of the upper part of the shovel C rests against the rear part of the frame B, as shown in figs. 1 and 2, where it is held in place by the lever catch D, as shown. When the dirt has been drawn to the desired place, by raising the free end of the lever catch D the shovel C is released and the load discharged. The scraper is then drawn by the team to the place from which the next load is to be taken. Then, by backing the team, the shovel C is brought into the proper position for scraping, and the lever catch D drops into place and holds it securely until again released, as before described.

I claim as new, and desire to secure by Letters Patent—

The frame B, tongue A, lever catch D, arms $b^1$, and shovel C, all constructed, arranged, and operating as herein set forth, for the purpose specified.

IRA MUNSON.

Witnesses:
AMMON BROWN,
LOUIS R. MUNSON.